United States Patent [19]

Bryant

[11] 4,205,960

[45] Jun. 3, 1980

[54] HYDROXYALKYL HYDROXY-AROMATIC CONDENSATION PRODUCTS AS FUEL AND LUBRICANT ADDITIVES

[75] Inventor: Charles P. Bryant, Euclid, Ohio

[73] Assignee: The Lubrizol Corporation, Wickliffe, Ohio

[21] Appl. No.: 5,623

[22] Filed: Jan. 22, 1979

Related U.S. Application Data

[60] Division of Ser. No. 901,173, Apr. 28, 1978, Pat. No. 4,163,730, which is a division of Ser. No. 678,101, Apr. 19, 1976, Pat. No. 4,108,784, which is a continuation-in-part of Ser. No. 459,750, Apr. 9, 1974, abandoned.

[51] Int. Cl.$^2$ ............................................. C10L 1/22
[52] U.S. Cl. ............................................. 44/68; 44/70; 44/71; 44/75
[58] Field of Search ........................... 44/70, 71, 75, 68

[56] References Cited

U.S. PATENT DOCUMENTS

| | | | |
|---|---|---|---|
| 2,370,299 | 2/1945 | Farrington | 252/56 R |
| 2,370,300 | 2/1945 | Farrington | 252/56 R |
| 2,615,845 | 10/1952 | Lippincott et al. | 252/56 R |
| 3,081,304 | 3/1963 | Rogier | 44/75 |
| 3,306,856 | 2/1967 | Shih-En Hu | 44/70 |
| 3,449,236 | 6/1969 | Engelhart | 252/56 R X |
| 3,542,680 | 11/1970 | LeSuer | 252/56 R X |
| 3,557,171 | 1/1971 | Andress, Jr. | 44/75 |
| 3,701,640 | 10/1972 | Lease et al. | 44/66 |
| 3,936,480 | 3/1976 | Demoures et al. | 44/71 |

OTHER PUBLICATIONS

Flett et al. "Maleic Anhydride Derivatives", 1952, pp. 185 and 205.
Martin, R.W., "The Chemistry of Phenolic Resins", 1956, pp. 224–225.

*Primary Examiner*—Patrick Garvin
*Assistant Examiner*—Y. Harris-Smith
*Attorney, Agent, or Firm*—James W. Adams, Jr.; Daniel N. Hall; Raymond F. Keller

[57] ABSTRACT

Condensation products made by reacting an α-hydroxyalkyl hydroxy-aromatic compound also having at least one non-fused hydrocarbyl substituent with at least one olefinic nitrile, carboxylic acid or carboxylic acid derivative are useful as additives for fuels and lubricants. The total number of carbon atoms in the non-fused hydrocarbyl substituents is at least about 7 while the αhydroxyalkyl group contains from 1 to about 36 carbons and the olefinic acid or nitrile reactant usually contains 2 to about 40 carbon atoms. Products made from hydroxymethyl alkyl-substituted phenols and α,β-olefinic acid derivatives such as maleic anhydride and particularly useful. Similarly useful post-treated products can be made from these condensation products by further reaction with alcohols, amines, metal salts or metals.

7 Claims, No Drawings

HYDROXYALKYL HYDROXY-AROMATIC CONDENSATION PRODUCTS AS FUEL AND LUBRICANT ADDITIVES

REFERENCE TO RELATED APPLICATIONS

This application is a division of my co-pending U.S. Application Ser. No. 901,173 filed Apr. 28, 1978 now U.S. Pat. No. 4,163,730 which, in turn, is a division of then copending application Ser. No. 678,101 filed Apr. 19, 1976, now U.S. Pat. No. 4,108,784 which is a continuation-in-part of application Ser. No. 459,750 filed Apr. 9, 1974, now abandoned.

BACKGROUND OF THE INVENTION

1. Field of the Invention

This invention relates to novel condensation products useful as additives for lubricants and normally liquid fuels, as well as to lubricant and normally liquid fuel compositions containing these additives. It also relates to processes for making such products, post-treated products made from them, and concentrates containing both types of materials. More particularly the additives of this invention are made by reacting certain alpha-hydroxyalkyl hydroxy-aromatic compounds with olefinic nitriles, acids, or acid derivatives.

2. Description of the Prior Art

The use of relatively high molecular weight compositions characterized by the presence within their structure of both lipophilic and lipophobic groups as additives for normally liquid fuels (e.g., gasoline, jet fuel, kerosene, fuel oil, heating oil, etc.) and naturally occurring and synthetic lubricants, is well known to the art. See, for example, the discussions in "Lubricant Additives" by C. V. Smalheer and R. Kennedy Smith published by the Lezius-Hiles Co., Cleveland, Ohio, particularly pages 2-5, and "Lubricant Additives" by M. W. Ranney, published by the Noyes Data Corporation, Park Ridge, N.J. (1973), particularly pages 3-92.

Among the additives that have been used in fuels and lubricants are those described in U.S. Pat. Nos. 3,701,640; 3,558,743; and 3,493,520.

The materials described in the U.S. Pat. Nos. 3,558,743 and 3,493,520 are made by reacting a carboxylic acid- or anhydride-containing addition copolymer, an amine, an alkylated phenol and an aldehyde, while those described in U.S. Pat. No. 3,701,640 are made by reacting a carboxylic acid with a polyamine having at least three nitrogen atoms, at least two of which are primary and at least one which is secondary, an alkyl-substituted phenol and formaldehyde.

U.S. Pat. Nos. 3,787,458 and 3,793,202 disclose products made by condensing a phenol with formaldehyde and an amine and then subsequently treating the product with acid or additional aldehyde.

Despite the knowledge evidenced by the above-noted prior art, the search for new additives for fuels and lubricants continues. This continuing search has been prompted in part by the increasingly severe demands for reductions in pollution caused by operation of engines as well as economic considerations and material shortages. It is an object of the present invention to provide additives, processes, concentrates and compositions which will aid in meeting these increased demands.

SUMMARY OF THE INVENTION

The condensation products of the present invention are made by reacting (A) at least one alpha-hydroxyalkyl hydroxy-aromatic compound of the general formula:

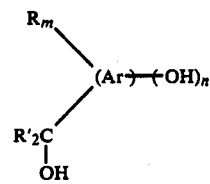

FORMULA I wherein Ar is an aromatic nucleus of 6 to about 30 carbon atoms, or an analog of such an aromatic nucleus substituted with 1 to 3 lower alkoxy, lower alkylthio, chloro, or nitro substituents, each R is a nonfused hydrocarbyl group of about 25 to about 700 carbon atoms, each R' is independently a hydrogen atom, an alkyl group of 1 to 36 carbon atoms, or a halogen-substituted alkyl group of 1 to about 36 carbon atoms, n is 1 to 3 and m is 1 to 5 with the provisos that (i) the total number of carbon atoms in the R' groups does not exceed 36 and (ii) where m exceeds 1, one of the R groups can also be a

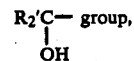

with (B) at least one hydrocarbyl, alpha-beta olefinically unsaturated compound selected from the group consisting of $C_{2-40}$ carboxylic acids and anhydrides, esters, amides and ammonium and metal salts of said $C_{2-40}$ carboxylic acids, the reaction of (A) with (B) resulting in the formation of carbon-to-carbon bond, said bond including the carbon of at least one

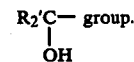

At least one hydroxy group of the hydroxy-aromatic compounds of FORMULA I is directly bonded to an aromatic carbon of Ar.

In a preferred embodiment both R' groups are hydrogen atoms and the hydroxyalkyl hydroxy-aromatic compound is of the general formula where R, Ar, m and n are as discussed herein.

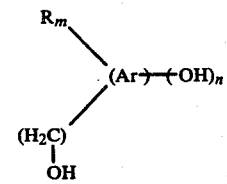

FORMULA II

In another preferred embodiment m is greater than two and one of the R groups is also a hydroxyalkyl group. Such embodiments can be represented by the general formula where R, R', and Ar are discussed herein.

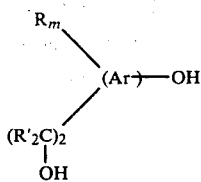

FORMULA III

The aromatic compounds of the present invention have at least one non-fused hydrocarbyl substituent (R in FORMULAE I, II or III) which can be saturated or ethylenically unsaturated, aliphatic, alicyclic or aromatic in nature. The term "non-fused" in this application and the appended claims is used to indicate that the substituent is attached at only one carbon to an aromatic ring of Ar. These R substituents are substantially saturated (i.e., they contain no more than one unsaturated carbon-to-carbon bond per every 10 carbon-to-carbon single bonds) substituents of about 25 and about 700 carbon atoms. Preferably they are saturated alkyl groups. While it is possible that each free carbon of the aromatic nucleus Ar of FORMULA I can bear an R substituent, it is preferable that no more than three do (i.e., m is 3). More typically, m is 1 or 2.

It is to be noted that when the term "hydrocarbyl" is used in describing a group or substituent in this specification and the appended claims, it is also intended to embrace substantially hydrocarbyl substituents unless expressly stated otherwise. Such substantially hydrocarbyl substituents are those which are substituted with nonhydrocarbyl groups which do not substantially affect the hydrocarbyl character or nature of the substituent in the context of the invention and which would, therefore, be considered to be within the scope of the term "hydrocarbyl" by the skilled worker in the art. For example, it is obvious that, in the context of this invention, a $C_{30}$ hydrocarbyl substituent and a $C_{30}$ hydrocarbyl substituent substituted with a methyl mercapto or methoxy group would be substantially similar in their properties with regard to their use in this invention, and would, in fact, be recognized as equivalents in the context of this invention by one of ordinary skill in the art.

Non-limiting examples of groups that do not significantly alter the hydrocarbyl nature of the hydrocarbyl substituents of this invention include the following:

Ether (especially hydrocarbyloxy and particularly alkoxy groups of up to 10 carbon atoms);
Oxa (e.g., —O— linkages in the main hydrocarbyl chain);
Hydroxy (i.e., not alpha-hydroxy)
Nitro
Cyano
Halo, particularly fluoro-, chloro- and bromo-;
Thioether (especially $C_1$–$C_{10}$ alkyl thioethers);
Thia, e.g., —S— linkages in the main hydrocarbyl chain;

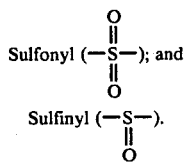

In general, when such non-hydrocarbyl groups are present in the R substituents of FORMULA I, there will be no more than 2 such groups for each 10 carbon atoms in the hydrocarbyl substituents; preferably not more than 1 for each 10 carbon atoms. Generally, however, it is preferred that no such substituents be present and that the R substituents be solely hydrocarbyl.

The non-fused hydrocarbyl substituents, R, of this invention are typically long-chain, relatively high molecular weight hydrocarbyl substituents having at least 25 carbon atoms, such as those typified by the alkyl groups derived from petroleum wax, which is a predominantly straight-chain aliphatic hydrocarbon of at least 25 carbon atoms. Relatively high molecular weight R groups derived from polymerization of lower olefins, particularly 1-monoolefins, can also be used as the source of the hydrocarbyl substituent.

Generally, the sources of the hydrocarbon R groups include principally the high molecular weight substantially saturated petroleum fractions and substantially saturated olefin polymers, particularly polymers of monoolefins having from 2 to about 30 carbon atoms. The especially useful polymers are the polymers of 1-monoolefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are exemplified by 2-butene, 3-hexene, and 4-octene.

Also useful are the interpolymers of the olefins such as those mentioned above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene; 3-methyl-1-butene with 1-octene; 3-3-dimethyl-1-pentene with 1-hexene; isobutene with styrene and piperylene; etc.

The relative proportions of the monoolefins to the other monomers in the interpolymers influence the stability and oil-solubility of the final substituted hydroxy aromatic condensation products containing groups derived from such interpolymers. Thus, for reasons of oil-solubility and stability the interpolymers contemplated for use in this invention should be substantially aliphatic and substantially saturated, i.e., they should contain at least about 80%, preferably at least about 95%, on a weight basis of units derived from the aliphatic monoolefins and no more than about 5% of olefinic linkages based on the total number of carbon-to-carbon covalent linkages. In most instances, the percentage of olefinic linkages should be less than about 2% of the total number of carbon-to-carbon covalent linkages.

Specific examples of such interpolymers include copolymer of 95% (by weight) of isobutene with 5% of styrene; terpolymer of 98% of isobutene with 1% of piperylene and 1% of chloroprene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene; terpolymer of 90% of isobutene with 2% of cyclohexene and 8% of propene; and copolymer of 80% of ethylene and 20% of propene.

Another source of the substantially hydrocarbon R groups comprises saturated aliphatic hydrocarbons such as highly refined high molecular weight white oils or synthetic alkanes such as are obtained by hydrogenation of high molecular weight olefin polymers illustrated above or high molecular weight olefinic substances.

The use of olefin polymers, having number average molecular weights ($\overline{M}n$) of about 750–5000 is preferred. Such $\overline{M}n$ are usually determined by vapor pressure osometry (VPO) although other methods known to those of skill in the art can be used, such as gel permeation chromatography (GPC). Higher molecular weight olefin polymers having $\overline{M}n$'s from about 10,000 to about 100,000 or higher have been found to be useful in specific instances.

Examples of particularly preferred R groups are those derived from polyisobutenes of $\overline{M}n$'s (VPO) ranging from about 300 to about 10,000. Preferably, these isobutenes have minimum $\overline{M}n$'s of about 700 or about 1000 and maximum $\overline{M}n$'s of about 3000 or about 5000 (all by VPO).

Such hydrocarbyl R groups can be bonded to the aromatic rings of the Ar moiety of FORMULA I by techniques well known to those of skill in the art, such as alkylation reactions in the presence of Lewis acids such as $BF_3$, $AlCl_3$, $SnCl_4$, etc. Since such alkylation techniques are well known, they need not be described further at this point.

The alpha-hydroxyalkyl hydroxy-aromatic compounds of this invention can often be conveniently derived by methods discussed hereinafter from hydrocarbyl-substituted hydroxy-aromatic precursors of the general formula;

   FORMULA IV wherein m' is 1 or 2. Typical of such precursors are the following:
- 2,4-dipolybutyl phenol wherein each polybutyl group has an average of 30 to 50 carbon atoms
- 2,4-polypropyl phenol, the polypropyl group having an $\overline{M}n$ of about 450
- 4-polyisobutyl phenol, the polyisobutyl group having an $\overline{M}n$ of about 2200, etc.

Many other suitable precursors within the above-discussed limitations will readily come to the mind of the skilled artisan. Mixtures of two or more of such precursors can also be used and in many instances may be commercially preferred because they do not involve costly separation processes in their production.

Further examples of hydroxy-aromatic precursors from which the alpha-hydroxyalkyl compounds of this invention can be derived include substituted phenols, resorcinols, hydroquinones, catechols, anisoles, xylenols, hydroxy-diphenyl compounds (i.e., phenyl phenols), benzyl phenol, phenylethyl phenol, bisphenol-A, alpha and beta naphthol, alpha and beta methyl naphthol, tolyl naphthol, benzyl naphthol, anthracenol, phenylmethyl naphthyl, phenanthrol, the monomethyl ether of catechol, phenoxy phenol, chlorophenol, and the like. Thus the Ar moiety of FORMULA I can be a phenyl, methylphenyl, diphenyl, naphthyl, anthryl, phenanthryl, chlorophenyl or phenoxyphenyl moiety.

The Ar moiety can also be a bridged moiety wherein two or more aromatic rings are connected through a bridging unit such as a covalent carbon-to-carbon bond (i.e., directly linking the two aromatic rings); an oxygen, sulfur, polysulfide,

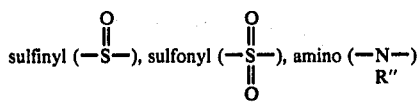

(R" being H or a $C_1$ to $C_{30}$ hydrocarbyl group), oxymethylene (e.g., $-CH_2OCH_2-$) or substituted methylene groups (wherein the substituents are $C_{1-7}$ hydrocarbyl groups), can also serve as bridging units.

Particularly preferred hydroxy-aromatic precursors used as sources of the hydroxyalkyl hydroxy-aromatic compounds of the present invention are mono-substituted phenols and naphthols, particularly the mono-substituted phenols (i.e., where Ar is phenyl and n is one in FORMULA I and II). In such mono-substituted phenols, R can be a relatively high molecular weight long-chain group, usually containing about 25 to 250 carbon atoms. Typically such groups are alkyl and alkenyl groups made from homo- and interpolymers of ethylene, propylene, butylene, or isobutylene.

In view of the above limitations it is clear that the alpha-hydroxyalkyl hydroxy-aromatic compounds of this invention will have a minimum of about fourteen carbon atoms. The maximum number of carbon atoms is limited only by the size of the non-fused R substituent, e.g., 700 carbons. Preferably, the alpha-hydroxyalkyl hydroxy-aromatic compounds will have a minimum of about thirty and a maximum of about 400 carbon atoms in their molecules.

The alpha-hydroxyalkyl hydroxy-aromatic compounds used in this invention can be made by a number of processes also well known to those of the art. A particularly useful method is by reaction of a hydroxy-aromatic precursor such as those described above in FORMULA IV, with a carbonyl reagent such as an aldehyde or ketone in the presence of basic material such as a metal oxide, hydroxide, alkoxide, carbonate, sulfide, mercaptide. In general, useful aldehydes or ketones contain between one and about 36 carbon atoms. Carbonyl reagents containing one to ten carbon atoms and no carbon-to-carbon bond unsaturation are particularly preferred. To produce the desired alpha-hydroxyalkyl

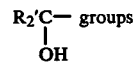

these aldehydes and ketones must be aliphatic or alicyclic alkyl in nature; preferably, they are aliphatic aldehydes such as formaldehyde, (and its polymers such as trioxane and paraformaldehyde as well as solutions such as formalin), acetaldehyde, butanal, octanal, octadecanal, etc.

Thus, among the preferred aldehydes for use in making the alpha-hydroxyalkyl hydroxy-aromatic compounds of the present invention are those of the general formula R'CHO, wherein R' is a hydrogen atom or an alkyl group of up to about 36 carbon atoms; normally wherein R is a hydrogen atom or alkyl group of up to six carbon atoms. Formaldehyde, including its polymers and solutions as described above is the preferred aldehyde.

In certain embodiments of this invention R' can be a halogen-substituted alkyl group of 1 to about 8 carbon atoms. Such groups are easily derived from halo-carbonyl reagents such as chloral, fluoro-acetone and hexachloroacetone.

Preferred ketones which can be used to produce the desired alpha-hydroxyalkyl

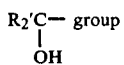

are those of the general formula

wherein each R' group is an alkyl group of up to about 34 carbon atoms with the proviso that the total number of carbons in both R''s is not more than about 36. Normally, the total of carbons is not more than about 6. Typical useful ketones include acetone, methyl-ethyl ketone, methylbutyl ketone, cyclohexanone, acetyl cyclopentane, methyl octadecyl ketone, etc. Acetone is the preferred ketone.

Methods for reacting the above-described carbonyl reagents with hydroxy-aromatic precursors are well known to those of skill in the art and need not be discussed in detail here. Generally about 0.5 to about 5.0 moles, preferably about 1 to 2 moles, of carbonyl reagent per mole of hydroxy-aromatic precursor is reacted at a temperature of about 30° C. to about 300° C., preferably about 50°–125° C., in the presence of a catalytic amount of at least one basic material such as those described above, preferably in the presence of about 0.1 equivalent. Preferred basic materials are Group Ia, Ib, IIa or IIb metal oxides, hydroxides, carbonates, $C_{1-8}$ alkoxides (including phenolates), sulfides and $C_{1-8}$ mercaptides. The reaction is often carried out in the presence of a non-volatile or volatile substantially inert normally liquid solvent or diluent (e.g., water, lower alkanol, petroleum naphtha or diluent mineral oil) for about 0.1 to about 48 hours. Preferred minimum reaction times are about one to about two hours while preferred maximums are about ten to about 18 hours. After completion of the reaction it is often desirable to neutralize the catalyst with an acid such as a $C_{1-8}$ monocarboxylic acid or an inorganic acid such as HCl, $H_2SO_4$, $H_3PO_4$ and the like. Inorganic acidic gases such as $CO_2$, $SO_2$, etc., can also be used.

When the reaction of the carbonyl reagent and the hydroxy-aromatic precursor is carried out at temperatures about 125° C. and higher, the product is often an oxymethylene or oxyalkyl-substituted methylene product formed by linkage of the original Ar groups through oxymethylene groups formed from the carbonyl reagent. Such oxymethylene-linked reaction products are believed to contain, for the most part, molecules represented by the general formula;

FORMULA V

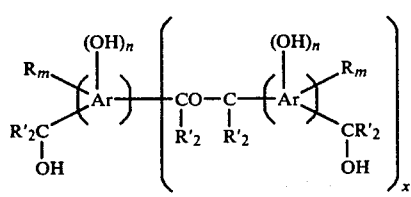

wherein x is 1 to about 4 and R, R', Ar, m and n are as described above.

While the just-described reaction of carbonyl reagent/hydroxy-aromatic precursor is among the preferred methods for producing the alpha-hydroxyalkyl compounds of the present invention, it is by no means the only such method. Other methods such as free radical or ionic oxidation of an appropriately substituted hydroxy-aromatic precursor (e.g., one having a methyl substituent) will readily occur to those of ordinary skill in the art. Therefore, in its broadest aspects, this invention is not limited by the process used to produce the alpha-hydroxy-alkyl alkylated hydroxy-aromatic compounds used as (A).

The condensation products of this invention are made by reacting the afore-described alpha-hydroxyalkyl alkylated hydroxy-aromatic compounds with at least one hydrocarbyl alpha, beta olefinically unsaturated compound selected from the group consisting of $C_{2-40}$ nitriles, $C_{2-40}$ carboxylic acids or derivatives thereof, or olefinic nitrile. The acid derivatives contemplated include anhydrides, esters, amides, ammonium salts, metal salts, etc., made by reacting the afore-said acids with various types of mono- and polyamines, mono- or polyhydric alcohols, epoxides, ammonia, metal salts, etc.

The olefinic carboxylic acids used in preparing the compositions of the present invention may be either monobasic or polybasic in nature. When they are polybasic they are often dicarboxylic acids although tri- and tetra-carboxylic acids can also be used. Generally, useful mono-basic acids have three to about forty carbon atoms; useful polybasic acids have four to forty carbon atoms. Preferably the maximum number of carbons for either type of acid is about twenty.

Exemplary monobasic olefinic carboxylic acids used in preparing the products of this invention are those of the formula: R°COOH wherein R° has between two and up to about thirty-nine, usually up to about twenty carbon atoms and is further characterized by the presence of at least one olefinically unsaturated carbon-to-carbon bond within its structure. R° can be aliphatic or alicyclic in nature and can contain other hydrocarboxyl substituents such as aryl groups, alkylaryl, heterocyclic, etc. Preferred acids correspond to the formula R*CH=CHCOOH or

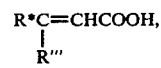

wherein R* is hydrogen or a saturated or ethylenically unsaturated aliphatic substituent of up to about 37 carbon atoms and is usually hydrogen or a $C_{1-7}$ alkyl group and R''' is hydrogen or a $C_1$ to $C_7$ alkyl group. R° can contain one or more olefinic linkages and these can be conjugated or nonconjugated. R° containing only one olefinic linkage is preferred.

Specific examples of useful alpha, beta-olefinic monobasic carboxylic acids are acrylic acid, methacrylic acid, cinnamic acid, crotonic acid, 3-phenyl propenoic acid, alpha, beta-decenoic acid, etc.

As stated above, the olefinic carboxylic acid reactant used to prepare the products of this invention can be polybasic, often dibasic, containing up to forty carbon atoms. Exemplary polybasic acids include maleic acid, fumaric acid, mesaconic acid, itaconic acid, citraconic acid.

The olefinic nitriles used to prepare the products of the present invention are generally analogous to the afore-described acids in that they have corresponding structures in which at least one of the carboxylic acid group has been replaced by a nitrile group. They also contain about two to about forty carbon atoms exclusive of the nitrile carbons. Thus, such compounds as acrylonitrile, methacrylonitrile, cinnamic nitrile, maleic and fumaric dinitrile, oleyl nitrile, 2-methylene glutaronitrile, etc., can be used to make the products of the present invention. Further examples include 1-butylvinyl nitrile, 1-hexylvinyl nitrile, 1-cyclohexenyl nitrile, 1-t-butylvinyl nitrile, 2-methylvinyl nitrile (i.e., crotonic nitrile), 2-dodecylvinyl nitrile, 2,2'-didodecylvinyl nitrile, 2-cyclopentylvinyl nitrile, 2-octyl-2-methylvinyl nitrile, etc. Other useful nitriles include such compounds as 1-phenylvinyl nitrile, 2-phenylvinyl nitrile, 1-tolylvinyl nitrile and 2-phenylethylvinyl nitrile.

As noted before, the acid derivatives useful in preparing the products of the present invention are generally anhydrides, esters, amides, amines, ammonium and metal salts of the afore-described acids. Methods of preparing such derivatives are well known to those of skill in the art and they can be satisfactorily described by noting the reactants used to produce them. Thus, for example, derivative esters for use in the present invention can be made by esterifying monohydric or polyhydric alcohols or epoxides with any of the afore-described acids. In general these mono- and polyhydric alcohols contain from one to about thirty carbon atoms, preferably one to about twenty carbon atoms. Exemplary aliphatic and alicyclic monohydric alcohols include methanol, ethanol, isopropanol, n-butanol, tertiary butanol, isooctanol, cyclopentanol, cyclohexanol, behenyl alcohol, hexacosanol, neopentyl alcohol, isobutyl alcohol, benzyl alcohol, beta-phenylethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, secondary pentyl alcohol, tertiary butyl alcohol, 5-bromo-dodec-5-enol, 3-nitro-octadecanol, the dioleate of glycerol, etc.

Useful polyhydric alcohols generally contain from two to ten hydroxy groups and two to about 25 carbons. These include, for example, ethylene glycol, dipentylene glycol, triethylene glycol, tetraethylene glycol, dipropylene glycol, tripropylene glycol, dibutylene glycol, tributylene glycol, neopentyl glycol and other alkylene glycols in which the alkylene radical contains from two to about eight carbon atoms. Other useful polyhydric alcohols include glycerol, monooleate of glycerol, monostearate of glycerol, monomethyl ether of glycerol, pentaerythritol, di- and tri-pentaerythritol, lower alkyl esters of 9,10-dihydroxy stearic acid, 1,2-butanediol, 2,3-hexanediol, trimethylolpropane, 2,4-hexanediol, pinacol, erythritol, arabitol, sorbitol, mannitol, 1,2-cyclohexanediol, xylene glycol, etc.

The derivative esters can also be derived from unsaturated alcohols such as allyl alcohol, cinnamyl alcohol, propargyl alcohol, 1-cyclohexene-3-ol, oleyl alcohol, etc. Still other classes of the alcohols capable of yielding the esters of this invention comprise the ether-alcohols and amino-alcohols including, for example, the oxy-alkylene-, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitol, phenoxyethanol, heptylphenyl-(oxy-propylene)$_6$-H, octyl-(oxyethylene)$_{30}$-H, phenyl-(oxyoctylene)$_2$-H, mono(heptylphenyl-oxypropylene)-substituted glycerol, poly-(styrene oxide), amino-ethanol, 3-amino ethyl-pentanol, di(hydroxyethyl)amine, p-aminophenol, tri(hydroxypropyl)amine, N-hydroxyethyl ethylene diamine, N,N,N',N'-tetrahydroxytrimethylene diamine, and the like. For the most part the ether-alcohols having up to about 15 oxy-alkylene radicals in which the alkylene radical contains from one to about eight carbon atoms are preferred. Generally the mono- and polyhydric alkanols of up to about 16 carbon atoms and one to six hydroxyl groups are preferred.

Suitable epoxides include ethylene, propylene, 1- and 2-butylene epoxides and higher homologs thereof having up to 20 carbon atoms. Cyclic epoxides such as 1,2-cyclohexenyl epoxide, styrene epoxide and 4-tertiary butyl epoxide can also be used, as can substituted epoxides such as 3-chloropropylene epoxide and 4-fluoro-1-butylene epoxide. Thio analogs (i.e., episulfides) of the above can also be used.

Similarly, amide and ammonium derivatives of the afore-described acids can also be used to make the products of this invention. Such derivatives are prepared from monoamino compounds, hydroxyamino compounds, polyamino compounds, and hydroxy polyamine compounds. For the purposes of this invention, hydrazines and organically substituted hydrazines are included within the various classes of amino compounds. Mixtures of these various amino compounds containing two or more of the foregoing amines can also be employed to make useful nitrogen derivatives.

Among the amines useful in preparing the nitrogen derivatives for use in this invention are monoamines. These monoamines can be tertiary, but more generally they contain at least one H-N- linkage (in other words, those containing only one hydrogen atom bonded directly to an amino nitrogen atom). Thus primary and secondary amines are typical. These amines are generally substituted with $C_{1-30}$ hydrocarbyl groups. Usually these hydrocarbyl substituents are aliphatic in nature and contain between one and ten carbon atoms. Saturated aliphatic hydrocarbyl substituents containing one to ten carbon atoms are generally useful.

The hydrocarbyl substituents of the above-described monoamines can be aliphatic, cycloaliphatic, and aromatic substituents (including aliphatic- and cycloaliphatic-substituted aromatic substituents and aromatic- and aliphatic-substituted cycloaliphatic substituents).

Among the preferred monoamines useful in making the derivatives used in making the products of the present invention are amines of the general formula HNR"$R^3$ wherein R" is an alkyl group of up to ten carbon atoms and $R^3$ is a hydrogen atom or an alkyl group of up to ten carbon atoms. Another preferred class of monoamines are aromatic monoamines of the general formula HNR$^4$R$^5$ wherein R$^4$ is a phenyl, alkylated phenyl, naphthyl or alkylated naphthyl group of up to ten carbon atoms and R$^5$ is a hydrogen atom, an alkyl group of up to 10 carbon atoms or R$^4$. Representative examples of these monoamines are ethyl amine, diethyl amine, n-butyl amine, di-n-butyl amine, allyl amine, isobutyl amine, coco amine, stearyl amine, lauryl amine, methyl lauryl amine, oleyl amine, aniline, paramethyl aniline, N-monomethyl aniline, diphenyl amine, benzyl amine, tolyl amine, methyl-2-cyclohexyl amine, etc.

Hydroxy amines are also included in the class of useful monamines. Such compounds are the hydroxy-hydrocarbyl-substituted analogs of the afore-described monoamines. Preferred hydroxy monoamines have the following general formulae: $HNR^7R^6$ and $HNR^9R^8$, wherein $R^7$ is an alkyl or hydroxy-substituted group of up to 10 carbon atoms, $R^6$ is a hydrogen atom or $R^7$, $R^9$ is a hydroxy-substituted phenyl, alkylated phenyl, naphthyl or alkylated naphthyl of up to 10 carbon atoms and $R^8$ is a hydrogen atom or $R^9$ with the provisos that at least one of $R^7$ and $R^6$ and at least one of $R^9$ and $R^8$ is hydroxy-substituted.

Suitable hydroxy-substituted monoamines include ethanol amine, di-3-propanol amine, 4-hydroxybutyl amine, diethanol amine, n-methyl-2-propyl amine, 3-hydroxy aniline, N-hydroxyethyl-ethylene diamine, N,N-di(hydroxypropyl)propylene diamine, and tris(hydroxymethyl)methyl amine, etc. While, in general, those hydroxy amines containing only one hydroxy group will be employed as reactants, those containing more can also be used. Mixtures of two or more such hydroxy amines can also be used.

Heterocyclic amines are also useful in making amide derivatives, providing they contain a primary or secondary amino group. The cycle can also incorporate unsaturation and can be substituted with hydrocarbyl substituents such as alkyl, alkenyl, aryl, alkaryl or aralkyl substituents. In addition, the cycle can also contain other heteroatoms such as oxygen and sulfur or other nitrogen atoms including those not having hydrogen atoms bonded to them. Generally, these cycles have 3 to 10, preferably 5 to 6 ring members. Among such heterocycles are aziridines, azetidines, azolidines, tetra- and dihydropyridines, pyrroles, piperidines, imidazoles, indoles, di- and tetra-hydroimidazoles, piperazines, isoindoles, purines, morpholines, thiamorpholines, N-aminoalkyl morpholines, N-aminoalkyl thiomorpholines, azepines, azocines, azonines, azecines and tetra-, di- and perhydro-derivatives of each of the above, and mixtures of two or more of these heterocycles. Preferred heterocyclic amines are the saturated 5- and 6-membered heterocycle amines containing only nitrogen, oxygen, or sulfur in the cycle, especially piperidines, piperazines, thiamorpholines, morpholines and pyrrolidines, as discussed above. Piperidine, piperazine, morpholine, and pyrrolidine are particularly preferred.

Alkylene polyamines are also useful as amines for preparing amide derivatives. These polyamines include hydroxy polyamines, and conform in the most part to the formula

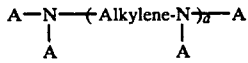

wherein a is an average of integers between about 1 and about 10, preferably between 2 and 8; each A is independently a hydrogen atom, a hydrocarbyl group or a hydroxy-substituted hydrocarbyl group having up to about 10 atoms, and "Alkylene" is a divalent hydrocarbyl radical of one to eighteen carbons, and analogous polyamines wherein one or more

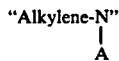

moiety is replaced by a cyclic moiety such as a "(alkylene)$_2$N" moiety (e.g., piperazine). Usually A is an aliphatic group of up to about 10 carbon atoms or an aliphatic group of up to about 10 carbon atoms substituted with one or two hydroxy groups, and "Alkylene" is a lower alkylene group having between 1 and 10, preferably 2 to 6 carbon atoms with the proviso that at least one A is hydrogen. Alkylene polyamines where each A is hydrogen are useful. Such alkylene polyamines include ethylene polyamines, butylene polyamines, propylene polyamines, pentylene polyamines, hexylene polyamines, heptylene polyamines, etc. The higher homologs of such amines and related aminoalkyl-substituted piperazines are also included.

Polyamines useful in preparing the amide derivatives include ethylene diamine, triethylene tetramine, tris(2-aminoethyl)amine, propylene diamine, trimethylene diamine, hexamethylene diamine, decamethylene diamine, octamethylene diamine, di(heptamethylene)triamine, triapropylene tetramine, tetraethylene pentamine, trimethylene diamine, pentaethylene hexamine, di(trimethylene)triamine, 2-heptyl-3-(2-aminopropyl)imidazoline, 1,3-bis(2-aminoethyl)imidazoline, 1-(2-aminopropyl)piperazine, 1,4-bis(2-aminoethyl)piperazine, 2-methyl-1-(2-aminobutyl)piperazine, etc. Higher homologs are obtained by condensing two or more of the above-illustrated alkylene amines and likewise are useful as are mixtures of two or more of the afore-described polyamines.

Ethylene polyamines, such as those mentioned above, are especially useful for reasons of cost and effectiveness. Such polyamines are described in detail under the heading "Diamines and Higher Amines" in "Encyclopedia of Chemical Technology", Second Edition, Kirk and Othmer, Volume 7, pages 27–39, Interscience Publishers, Division of John Wiley and Sons, 1965. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines. These mixtures are particularly useful in preparing the compositions of this invention. On the other hand, quite satisfactory products can also be obtained by the use of pure alkylene polyamines.

Hydroxy polyamines, e.g., alkylene polyamines having one or more hydroxyalkyl substituents on the nitrogen atoms, are also useful in preparing amide or ester derivatives. Preferred hydroxyalkyl-substituted alkylene polyamines are those in which the hydroxyalkyl group is a lower hydroxyalkyl group, i.e., having less than about 10 carbon atoms. Examples of such hydroxyalkyl-substituted polyamines include N-(2-hydroxyethyl)ethylene diamine, N,N'-bis(2-hydroxyethyl)ethylene diamine, 1-(2-hydroxyethyl)piperazine, monohydroxypropyl-substituted diethylene triamine, dihydroxypropyl-substituted tetraethylene pentamine, N-(3-hydroxybutyl)tetramethylene diamine, etc.

Higher homologs are obtained by condensation of the above-illustrated hydroxyalkly-substituted alkylene amines through amino radicals or through hydroxy radicals as well as mixtures of the above are likewise useful.

The amide derivatives useful in making the products of this invention can also be prepared from hydrazine or an organo-substituted hydrazine of the general formula

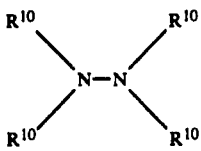

wherein each $R^{10}$ is independently hydrogen or a $C_1$–$C_{30}$ hydrocarbyl substituent, usually with at least one $R^{10}$ being a hydrogen atom. More generally at least two $R^{10}$ groups are hydrogen. Often at least two $R^{10}$ groups bonded to the same nitrogen atom are hydrogen and the remaining $R^{10}$ groups are alkyl groups of up to ten carbon atoms.

Examples of substituted hydrazines are methylhydrazine, N,N-dimethylhydrazine, N,N'-dimethylhydrazine, phenylhydrazine, N-phenyl-N'-ethylhydrazine, N-(p-tolyl)-N'-(n-butyl)hydrazine, N-(p-nitrophenyl)-N-methylhydrazine, N,N'-di-(p-chlorophenyl)hydrazine, N-phenyl-N'-cyclohexylhydrazine, etc.

Mixtures of two or more of the afore-described amines and polyamines can also be used in making the amide derivatives used in making the products of this invention.

Also among the useful amide derivative products are N-acrylo- and methacrylo-amino sulfonic acids such as those disclosed in U.S. Pat. No. 3,717,687 which is hereby incorporated by reference for its relevant disclosures.

Means for the production of ester and nitrogen derivatives from the afore-described alcohols and amines are well known to those of skill in the art and need not be described in detail here.

The ammonium salt derivatives can also be made from any of the afore-described amines as well as from tertiary amino analogs of them (i.e., analogs wherein the

—NH groups have been replaced with

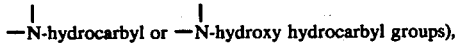
—N-hydrocarbyl or —N-hydroxy hydrocarbyl groups), ammonia or ammonium compounds (e.g., NH₄Cl, NH₄OH, etc.) by techniques well known to those of skill in the art.

The metal salt derivatives useful in making the condensation products of the present invention can also be made by techniques well known to those of skill in the art. Preferably they are made from a metal, mixture of metals, metal salt or mixture of metal salts where the metal is chosen from Group Ia, Ib, IIa or IIb of the periodic table although metals from Groups IVa, IVb, Va, Vb, VIa, VIb, VIIb and VIII can also be used. The gegen ion (i.e., counter) of the metal salt can be inorganic such as halide, sulfide, oxide, hydroxide, nitrate, sulfate, thiosulfate, phosphite, phosphate, etc., or organic such as lower alkanoic, sulfonate, etc. The salts formed from these metals and the acid products can be either "normal" salts wherein the metal and acid are present in stoichiometric amounts or "overbased" salts (sometimes referred to as "superbased" salts) wherein the metal is present in a stoichiometric excess relative to the number of stoichiometric equivalents of carboxylic acid-producing compounds from which it is produced. The production of the latter are well known to those of skill in the art and are described in detail in the aforecited "Lubricant Additives" by M. W. Ranney, pages 67–77, which is hereby incorporated by reference for its relevant disclosures pertaining to methods for preparing overbased salts.

To form the condensation products of this invention, the afore-described hydroxyalkyl hydroxy-aromatic compounds and carboxylic acid, acid derivative or nitrile compounds are reacted together at a temperature ranging from about 50° C. to the decomposition temperature of the reactant or product present having the lowest decomposition temperature. Preferably the lowest reaction temperature is about 100° C., more preferably 150° C., while the highest reaction temperature is preferably about 300° C., more preferably 250° C. Generally the ratio of the hydroxy compound (A) to acid, acid derivative, or nitrile; that is, (B) is between about 0.5:1 to about 2:1. The reaction is normally carried out in about 0.5 to about 96 hours. It is often desirable to carry out such reactions in the presence of a substantially inert normally liquid solvent or diluent such as hydrocarbons, alcohols, or ethers, or a lubricant base stock such as those described below.

After reaction the carboxyl or nitrile groups in the condensation product of this invention can be further modified by post-treatments with one of the afore-described alcohols, amino-compounds, epoxides, metals or salts. Such treatments and the means and conditions for carrying them out are well known to those of ordinary skill in the art and require no detailed description herein.

Post-treated reaction products can be made by reacting the reaction products described above with a post-treating reactant selected from the group consisting of (1) mono- and polyhydric alkanols and alkenols of 1 to about 10 carbon atoms and 1 to about 6 hydroxyl groups, (2) mono- epoxides of $C_{2-18}$ alkenes, (3) alkyl monoamines of 1 to about 18 carbon atoms, (4) alkylene polyamines of 2 to about 10 nitrogen atoms and 2 to about 36 carbon atoms and (5) mixtures of two or more of (1) to (4) including mixtures within one class and mixtures of species selected from two or more classes. For example, a nitrile group can be converted to an amidine or amide through reaction with an amine hydrolysis, etc., or to an amino group through hydrogenation. The post-treated products thus formed generally have utilities similar to those of the condensation products.

The condensation products of this invention are characterized by the fact that the reaction of the hydroxy aromatic compound (A) with the olefinic acid or nitrile (B) results in the formation of a carbon-to-carbon bond which includes as one of its carbon atoms the carbon of at least one

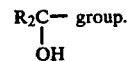
$R_2C$— group.

This means that the reaction of (A) with (B) is not a simple esterification although some esterification may occur.

EXAMPLE 1(a)

A mixture of 1040 parts of a polyisobutyl phenol (polyisobutyl group Mn 885) and 326 parts of diluent oil at 55° C. is treated with four parts of saturated aqueous sodium hydroxide. The temperature of the mixture is then increased to 75° C. and 72 parts of paraformaldehyde is added. The mixture is held at 75° C. for two additional hours and then stored at 30° C. for 16 hours. The hydroxide catalyst is neutralized with four parts of acetic acid and an additional 480 parts of diluent oil is added to the reaction mixture before it is stripped at 40°–75° C./8-torr. Infrared analysis of the residual oil solution establishes formation of the desired hydroxymethyl intermediate.

EXAMPLE 1(b)

A mixture of 1918 parts of the oil solution described in Example 1(a) and 150 parts of maleic anhydride is heated in slow stages of 194° C. over three hours and held at 190°–195° C. for two hours. It is then stripped to 190° C./10-torr for one hour and filtered through filter aid to provide an oil solution of the desired condensation product.

EXAMPLE 2

To 1453 parts of the oil solution described in Example 1(b) at 85° C. is slowly added 63.5 parts of a commercial polyethylene polyamine mixture having three to seven amino groups per molecule. The reaction mixture is then heated to 165° C. and held at this temperature for three hours while being blown with nitrogen. After storage over night at room temperature, it is heated to 175° C. with nitrogen blowing for an additional three hours and stripped at 170° C./8-torr for one hour. Filtration through filter aid provides an oil solution of the desired product.

EXAMPLE 3(a)

To a mixture of 4480 parts of the polyisobutyl-substituted phenol described in Example 1(a) and 3099 parts of diluent oil at 40° C. is added 32 parts of concentrated aqueous sodium hydroxide and 290 parts of paraformaldehyde. The mixture is kept at 80°–85° C. for 15 hours and then 36 parts of acetic acid is added, to neutralize the basic catalyst. The mixture was then held at 110°–130° C. for a total of 12 hours and filtered through diatomaceous earth to provide 7051 parts of an oil solution containing the desired hydroxymethyl intermediate.

EXAMPLE 3(b)

To a mixture of 1258 parts of the oil solution described in Example 3(a) at 90° C. is slowly added 56 parts of acrylic acid. The reaction temperature is increased slowly over 1.5 hours to 180° C. and held at 180°–210° C. for eight hours. The mixture is stripped to 190° C./20-torr and filtered to provide an oil solution of the desired condensation product.

EXAMPLE 4

To 1020 parts of the condensation product described in Example 3(b) at 125° C. is added 30.8 parts of the polyethylene polyamine described in Example 2. The reaction temperature is increased to 165° C. over one hour and held at 150°–165° C. for eight hours while being blown with nitrogen. Filtration of the mixture provides 933 parts of an oil solution of the desired product.

EXAMPLE 5(a)

To a mixture of 1268 parts of a hydroxymethylated phenol prepared in the same manner described in Example 1(a) and 248 parts of diluent oil at 50° C. is added 108 parts of chloromaleic anhydride. The reaction mixture is heated to 195° C. and held at this temperature for 11 hours. It is then cooled to 150° C. and stripped to 170° C./10-torr. The resulting residual mixture is filtered through filter aid to provide an oil solution of the desired condensation product.

EXAMPLE 5(b)

To a mixture of 288 parts of diluent oil and 61.5 parts of the polyethylene polyamine described in Example 2 at 70° C. is added 1200 parts of the oil solution described in Example 5(a). The mixture is held at 160° C. for one hour and raised to 195° C. over a two hour period. It is then cooled to 150° C. and filtered through diatomaceous earth to provide an oil solution of the desired product.

EXAMPLE 6

A mixture of 1145 parts of the condensation product described in Example 1(b) and 72 parts of pentaerythritol is heated to 220° C. over 1.5 hours and held at this temperature for an additional seven hours. Eighty grams of diluent oil is then added to the mixture and it is filtered at 120° C. through filter aid to provide an oil solution of the desired ester.

EXAMPLE 7(a)

A mixture of 5180 parts of polyisobutyl phenol (polyisobutyl group, Mn 1037), 200 parts of sodium hydroxide pellets and 1000 parts of Stoddard solvent is heated to 60°–160° C. for 2½ hours. Then nitrogen is blown through the mixture at 160°–190° C. for 3.5 hours while water azeotropes from it. It is heated an additional 5.5 hours at 190°–197° C. Then the mixture is treated at 135°–145° C. with 337 parts of $S_2Cl_2$ in a dropwise fashion over three hours. During the addition a nitrogen flow of 0.2 cfh is maintained through the mixture and a caustic trap is used to trap any $H_2S$ or HCl evolved. After completion of the addition, the mixture is heated for an additional two hours at 130°–135° C. Then 650 parts of water, 20 parts of aqeous hydrochloric acid and 750 parts of toluene is added to the mixture at 35° C. It is heated to 100° C. for a total of fifteen hours while being nitrogen blown at 1 cfh. Then 1325 parts of diluent oil is added to the mixture and 100 parts of diatomaceous earth. The mixture is filtered at 100° C. through a pad of diatomaceous earth to remove the salt precipitate. Stripping of the filtrate to 183° C./25-torr provides the desired polysulfide-linked product.

EXAMPLE 7(b)

A mixture of 641 parts of the polysulfide-linked product described in Example 7(a), 16 parts of paraformaldehyde and 32 parts of butanol is heated at 105°–135° C. for a total of 13 hours while being nitrogen blown at 1 cfh. The mixture is then stripped of butanol and water to 134° C./21-torr. Maleic anhydride (71 parts) is then added to the mixture and it is heated to 205° C. over a 2.5 hour period. It is then held at 205°–210° C. for 5.5 hours and stripped to 210° C./19-torr. After addition of 250 parts of diluent oil the mixture was filtered at 130° C. through filter aid to give an oil solution of the desired condensation product.

As previously indicated, the condensation products of this invention are useful as additives in preparing lubricant compositions where they function primarily as detergents and dispersants, particuarly where the oil is subjected to high temperature environments or to cyclic stresses such as those encountered in stop-and-go automobile driving. Many such compositions are particularly useful in dispersing engine sludge and reducing engine varnish. The products of this invention can be employed in a variety of lubricant compositions based on diverse oils of lubricating viscosity, including natural and synthetic lubricating oils and mixtures thereof. These lubricant compositions include crankcase lubricating oils for spark-ignited and compression ignited internal combustion engines, including automobile and truck engines, two-cycle engines, rotary engines, aviation piston engines, marine and railroad diesel engines, and the like. In addition, automatic transmission fluids, transaxle lubricants, gear lubricants, metal-working lubricants, hydraulic fluids and other lubricating oil and grease compositions can also benefit from the incorporation therein of the products of the present invention.

Natural oils useful in making these compositions include animal oils and vegetable oils (e.g., castor oil, lard oil) as well as liquid petroleum oils and solvent-refined or acid-refined mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); alkylbenzenes (e.g., dodecyl benzenes, tetradecylbenzenes, dinonylbenzenes, di-(2-ethylhexyl)-benzenes, etc.); polyphenyls (e.g., biphenyls, terphenyls, etc.); and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, ethylene glycol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as trimethylolpropane, pentaerythritol, dipentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra(2-ethylhexyl)silicate, tetra-(4-methyl-2-tetraethyl)-silicate, tetra-(p-tert-butylphenyl)silicate, hexyl-(4-methyl-2-pentoxy)-disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

The preferred lubricating oils which serve as base stocks for the lubricant compositions of this invention have viscosities ranging from about 100 centistokes at 0° F. to about 2000 centistokes at 210° F.

Generally, the lubricant compositions of the present invention contain an amount of the condensation products or post-treated products of this invention sufficient to provide the composition with anti-rust, sludge dispersancy and engine detergent properties. Normally this amount will be about 0.05 to about 20, preferably about 0.50 to about 10% of the total weight of the lubricant composition. In lubricating oils operated under extremely adverse conditions, such as lubricating oils for marine diesel engines, the reaction products of this invention may be present in amounts of up to about 30% by weight.

The lubricant compositions of the present invention can contain, in addition to the products of this invention, other additives that are normally used in lubricants. Such additives include, for example, auxiliary detergents of the ash-forming and of the ashless type, viscosity index improving agents, pour-point depressants, anti-foam agents, extreme pressure agents, rust-inhibiting agents, oxidation- and corrosion-inhibiting agents.

The normally liquid fuel compositions of this invention are generally derived from petroleum sources, e.g., normally liquid petroleum distillate fuels, though they may include those produced synthetically by the Fischer-Tropsch and related processes, the processing of organic waste material or the processing of coal, lignite or shale rock. Such fuel compositions have varying boiling ranges, viscosities, cloud and pour points, etc., according to their end use as is well known to those of skill in the art. Among such fuels are those commonly known as motor and aviation gasoline, diesel fuels, jet engine fuels, kerosene, distillate fuels, heating oils, residual fuels, bunker fuels, etc. The properties of such fuels are well known to skilled artisans as illustrated, for example, by ASTM Specifications D #396-73 (Fuel Oils) and D #439-73 (Gasolines) available from the American Society for Testing Materials, 1916 Race Street, Philadelphia, Pa. 19103.

The fuel compositions of the present invention can contain about 0.001% to about 5% (based on the weight of the final composition), preferably about 0.001% to about 1%, of the above-described condensation and post-treated products. The presence of these products can impart many desirable characteristics to the fuel composition depending upon the particular composition and fuel mixture selected. Thus in gasolines they may improve the overall composition ability to retard corrosion of metal parts with which it may come in contact or improve the fuel's ability to clean carburetors and reduce carburetor icing. On the other hand, these products can be used in fuel oil compositions and other normally liquid petroleum distillate fuel compositions to impart anti-screen clogging and demulsifying properties to the fuel.

The fuel compositions of this invention can contain, in addition to the products of this invention, other additives which are well known to those of skill in the art. These can include anti-knock agents such as tetraalkyl lead compounds, lead scavengers such as halo-alkanes, deposit preventers or modifiers such as triaryl phosphates, dyes, cetane improvers, anti-oxidants such as 2,6-di-tertiary-butyl-4-methylphenol, rust inhibitors, such as alkylated succinic acids and anhydrides, bacterio-static agents, gum inhibitors, metal deactivators, upper cylinder lubricants and the like.

In one embodiment of the present invention, the afore-described condensation and post-treated products are combined with other ashless dispersants for use in fuels and lubricants. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Pat. No. 1,396,645; British Pat. Nos. 981,850 and 1,055,337; and U.S. Pat. Nos. 3,255,108; 3,311,558; 3,331,776; 3,346,354; 3,579,450; 3,542,680; 3,381,022; 3,639,242; 3,697,428; 3,708,522; and British Patent Specification 1,306,529. These patents are expressly incorporated herein by reference for their disclosure of suitable esters and methods for their preparation.

Generally, the weight ratio of the condensation or post-treated products of the invention to the aforesaid ashless dispersants is about 0.1 to 10.0, preferably about 1.0 to 10 parts of reaction product to one part ashless dispersant. Preferred weight ratios are between 0.5 to 2.0 parts reaction product to 1 part dispersant. In still another embodiment of this invention, the inventive additives are combined with Mannich condensation products formed from substituted phenols, aldehydes, polyamines, and substituted pyridines. Such condensation products are described in U.S. Pat. Nos. 3,649,659; 3,558,743; 3,539,633; 3,704,308; and 3,725,277, which are incorporated herein by reference for their disclosure of the preparation of the Mannich condensation products and their use in fuels and lubricants. When the additives of this invention are combined with the Mannich condensation products, a weight ratio of about 10 to about 0.1 parts reaction product of this invention per one part Mannich condensation product is used.

The condensation and post-treated products of this invention can be added directly to the fuel or lubricant to be treated or they can be diluted with an inert solvent/diluent such as the various oils and normally liquid fuels described in detail above to form an additive concentrate. These concentrates generally contain about 20 to about 90 percent product and can contain in addition any of the above-described prior art additives, particularly the afore-described ashless dispersants in the aforesaid proportions. The solvent/diluents used in these concentrates are generally substantially inert, normally liquid organic materials.

The lubricant, fuel and additive concentrate compositions of this invention are exemplified by the following:

EXAMPLE 8

A gasoline having a Reid vapor pressure of 8.4 psi and containing 120 parts per million parts of gasoline of the reaction product described in Example 2.

EXAMPLE 9

A diesel fuel oil containing 250 part per million parts of fuel of the reaction product described in Example 4.

EXAMPLE 10

A solvent-refined, neutral SAE 10 mineral oil containing 0.5% of the reaction product described in Example 2.

EXAMPLE 11

A synthetic lubricant comprised predominantly of $C_5$–$C_9$ normal alcohol esters of a 50/50 molar mixture of adipic and glutaric acids containing 0.5% of the reaction product described in Example 4.

EXAMPLE 12

A concentrate comprising 50% of the mineral oil of Example 8 and 50% of the product described in Example 4.

The lubricant and liquid fuel compositions of this invention and the condensation products and post-treated products of this invention and the processes for preparing these products have been specifically exemplified above to aid those skilled in the art in understanding and practicing the invention. Many obvious variations and departures from the specific disclosure will be apparent to those of skill in the art based on principles and teachings herein and in the prior art. Such variations and departures are contemplated as being within the scope of the present invention unless clearly excluded by the appended claims.

In this specification and the appended claims all parts and percentages are parts by weight and percents by weight.

I claim:

1. A fuel composition comprising a major amount of a normally liquid fuel and a minor but carburetor cleaning or anti-screen clogging amount of a product made by the process comprising reacting (A) at least one alpha hydroxy aromatic compound of the general formula

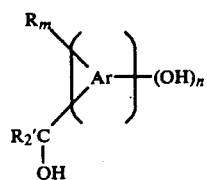

wherein Ar is a hydrocarbyl aromatic nucleus of 6 to about 30 carbon atoms, or an analog of such an aromatic nucleus substituted with 1 to 3 lower alkoxy, lower alkylthio, chloro, or nitro substituents, each R is a non-fused hydrocarbyl group of about 25 to about 700 carbon atoms, each R' is independently a hydrogen atom, an alkyl group of 1 to 36 carbon atoms, or a halogen-substituted alkyl group of 1 to about 36 carbon atoms, n is 1 to 3 and m is 1 to 5 with the provisos that (i) the total number of carbon atoms in the R' groups does not exceed 36 and (ii) where m exceeds 1, one of the R groups can also be a

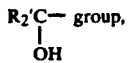

with (B) at least one hydrocarbyl, alpha-beta olefinically unsaturated compound selected from the group consisting of $C_{2-40}$ nitriles, $C_{2-40}$ carboxylic acids and anhydrides, esters, amides and ammonium and metal salts of said $C_{2-40}$ carboxylic acids, the reaction of (A) with (B) resulting in the formation of carbon-to-carbon bond, said bond including the carbon of at least one

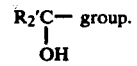

2. A composition as claimed in claim 1 wherein m is 1 or 2.

3. A composition as claimed in claim 2 wherein Ar is a benzene nucleus.

4. A composition as claimed in claim 1 or 2 wherein each R is a homo- or interpolymer of ethylene, propylene, butylene or isobutylene.

5. A composition as claimed in claim 1, 2, 3, or 4 wherein R' is hydrogen.

6. A composition as claimed in claim 1, 2, or 5 wherein (B) is an acid or anhydride.

7. A composition as claimed in claim 6 wherein (B) is maleic anhydride.

* * * * *